US012351356B2

(12) United States Patent
Bandholz et al.

(10) Patent No.: US 12,351,356 B2
(45) Date of Patent: Jul. 8, 2025

(54) ASYMMETRIC PEEL PLATE FOR A LABEL-DISPENSING APPARATUS AND PEEL ASSIST PLATE

(71) Applicant: Brady Worldwide, Inc., Milwaukee, WI (US)

(72) Inventors: Brent Bandholz, Hubertus, WI (US); Katherine A. Cherney, River Hills, WI (US); Joshua Gratz, Whitefish Bay, WI (US)

(73) Assignee: Brady Worldwide, Inc., Milwaukee, WI (US)

(*) Notice: Subject to any disclaimer, the term of this patent is extended or adjusted under 35 U.S.C. 154(b) by 0 days.

(21) Appl. No.: 18/019,433

(22) PCT Filed: Jul. 29, 2021

(86) PCT No.: PCT/US2021/043757
§ 371 (c)(1),
(2) Date: Feb. 2, 2023

(87) PCT Pub. No.: WO2022/031518
PCT Pub. Date: Feb. 10, 2022

(65) Prior Publication Data

US 2023/0264847 A1 Aug. 24, 2023

Related U.S. Application Data

(60) Provisional application No. 63/061,002, filed on Aug. 4, 2020.

(51) Int. Cl.
*B65C 9/00* (2006.01)

(52) U.S. Cl.
CPC ...... *B65C 9/0006* (2013.01); *B65C 2009/009* (2013.01)

(58) Field of Classification Search
CPC .......... B65C 9/0006; B65C 2009/0009; B65C 2009/0012; B65C 2009/009; B65C 2210/0078; B65C 2009/0093
See application file for complete search history.

(56) References Cited

U.S. PATENT DOCUMENTS 3,642,215 A 2/1972 Bishop et al.
4,059,203 A 11/1977 Wright
(Continued)

FOREIGN PATENT DOCUMENTS

CA 1032907 A1 6/1978
FR 2661394 A1 10/1991
(Continued)

OTHER PUBLICATIONS

PCT International Search Report and Written Opinion, PCT/US2021/043757, Nov. 16, 2021, 11 pages.
(Continued)

*Primary Examiner* — George R Koch
(74) *Attorney, Agent, or Firm* — Quarles & Brady LLP

(57) ABSTRACT

An asymmetric peel plate for a label-dispensing apparatus for separating labels from a liner as the liner travels along a liner path extending in a longitudinal direction through the label-dispensing apparatus. The asymmetric peel plate includes one or more liner support surfaces defining a portion of the liner path and further includes a peel edge disposed at a longitudinally forward end of the liner support surface(s) in which the peel edge extends forwardly along the longitudinal direction to a peel edge apex. No plane exists perpendicular to the liner path if the liner was unbent that is collinear with a bending line in which the peel edge is reflectionally symmetrical about the plane.

10 Claims, 6 Drawing Sheets

(56) References Cited

U.S. PATENT DOCUMENTS

| | | | |
|---|---|---|---|
| 4,089,730 | A | 5/1978 | Mahn |
| 5,133,396 | A | 7/1992 | Selak et al. |
| 6,142,686 | A | 11/2000 | Schanke et al. |
| 6,766,844 | B1 | 7/2004 | Watkins |
| 6,875,304 | B2 | 4/2005 | Schanke et al. |
| 7,178,572 | B2 | 2/2007 | Schanke et al. |
| 7,231,952 | B2 | 6/2007 | Schanke et al. |
| 7,469,736 | B2 | 12/2008 | Fries et al. |
| 7,757,739 | B2 | 7/2010 | Fries et al. |
| 8,033,312 | B2 | 10/2011 | Fries et al. |
| 8,186,408 | B2 | 5/2012 | Fries et al. |
| 8,524,027 | B2 | 9/2013 | Anwar et al. |
| 8,550,139 | B2 | 10/2013 | Cooper et al. |
| 2004/0050497 | A1 | 3/2004 | Presutti et al. |
| 2004/0079490 | A1 | 4/2004 | Ito |
| 2006/0060293 | A1 | 3/2006 | Constantine |
| 2010/0012677 | A1 | 1/2010 | Farmer et al. |
| 2012/0312458 | A1 | 12/2012 | Auton et al. |
| 2013/0126100 | A1 | 5/2013 | Fujita |

FOREIGN PATENT DOCUMENTS

| | | | |
|---|---|---|---|
| FR | 2759618 | A1 | 8/1998 |
| GB | 1563892 | | 4/1980 |
| GB | 2464218 | A | 4/2010 |
| GB | 2478966 | A | 9/2011 |
| JP | S63190015 | U | 12/1988 |
| JP | 2001261226 | A | 9/2001 |
| JP | 2005271944 | A | 10/2005 |
| JP | 2005320030 | A | 11/2005 |
| JP | 5690573 | B2 | 3/2015 |
| WO | 2006033976 | A2 | 3/2006 |

OTHER PUBLICATIONS

European Patent Office, Partial Search Report, Application No. 21854340.3, May 19, 2025, 14 pages.

ASYMMETRIC PEEL PLATE FOR A LABEL-DISPENSING APPARATUS AND PEEL ASSIST PLATE

CROSS-REFERENCE TO RELATED APPLICATIONS

This application represents the U.S. national stage entry of International Application No. PCT/US2021/043757 filed Jul. 29, 2021, which claims the benefit of U.S. Provisional Patent Application No. 63/061,002 entitled "Asymmetric Peel Plate for a Label-Dispensing Apparatus and Peel Assist Plate" filed on Aug. 4, 2020, which is incorporated by reference herein for all purposes.

STATEMENT OF FEDERALLY SPONSORED RESEARCH OR DEVELOPMENT

Not applicable.

BACKGROUND

This disclosure relates to label dispensing devices. In particular, this disclosure relates to devices for the dispensing of labels carried on a liner or web.

Label printers are commonly used to print text, barcodes, and other images. For such label printers, labels are usually provided on a release liner from which the labels can be separated. Typically, a web is fed through the printer with the labels on the liner and, after printing, the printed label may be removed from the web such that the adhesive on one side of the label is exposed, and the label applied to an item.

Many label printers require that, after the label has been printed, a user manually removes the printed label from the web and then applies the printed label to an object. However, to facilitate efficiency in high-throughput working environments, some printers have been designed to perform some of these routine actions that would otherwise need to be manually performed by the user.

For example, U.S. Patent Application Publication No. 2012/0312458 published on Dec. 13, 2012 discloses a printer configured to automatically separate a label from a liner. Such separation is achieved by bending the liner with the label still attached in a direction transverse to the feed direction. Then, the bent label and liner are fed over the edge of a "beak" at which point the direction of travel of the bent web changes within a very short distance. Because the label is stiffer than the liner, when the bent web is run over the beak, the label separates from the liner.

SUMMARY OF THE INVENTION

The separation beaks or label dispensers of existing printers are somewhat limited in their range of application and flexibility of use. For example, conventional separation beaks or label dispensers are typically designed to dispense the label from the liner along a center of the travel path where the beak extends to a point. However, this conventional design is restrictive in that it can limit the size of the liner and the label to be dispensed therefrom for a particular label dispenser. This is particularly an issue when a lateral side of the dispensed label is to be aligned with a set location on the object to which the label is to be affixed. Attempting to use a differently sized label (that is, one of a different width) can create problems in that the label can skew upon application, the liner may slightly drift, and/or the label dispensed may be "stubbed" onto the object onto which it is to be attached.

To maintain liner alignment better and to improve accuracy through a label printer and a label dispenser, it has been found that providing a datum edge along which the liner can follow aids in preventing the liner from "wandering" and the uneven dispensing of labels. To ensure the printing is applied consistently to labels of different sizes, a reference side of the labels—regardless of their width—are spaced consistently from the datum edge. However, because labels can be provided in different sizes, if this distance from the datum edge to the lateral side of the label is to be maintained, this means the label may no longer be sufficiently centered about the bending line and tip or apex of the peel edge of the peel plate or beak. This can mean that printing and dispensing on smaller labels may not be possible or that, based on position of the centered bending line and tip of the peel edge, such small labels may be particularly prone to issues with separation from the liner.

The disclosed label-dispensing apparatus permits a wider range of labels (for example, labels of various widths, stiffnesses, and so forth) to be used on a liner of a predetermined width that follows along a datum edge along one lateral edge of the liner. The label-dispensing apparatus can have a peel plate with a peel edge having a peel edge apex or point, in which the peel edge apex is off-center within the peel plate. Put differently, the peel plate is intentionally asymmetrical. By offsetting the point or apex of the peel edge from the center and placing it closer to the datum edge or guide edge, a greater selection of widths of labels can be reliably dispensed from a single label-dispensing apparatus than is the case in a label-dispensing apparatus in which the peel plate is symmetrical with the bend in the middle of the peel plate.

Moreover, variations of this asymmetric design permit for the angles of the liner support surfaces and/or the peel edges to be modified or adapted to maintain at least three equal path lengths along the width of the liner (or, more generally, to equalize path lengths over the width) as the liner passes through the label-dispensing apparatus and to a take-up mechanism (for example, a nip point or return spool). By maintaining three equal path lengths along the width of the liner (or more generally, equalizing the tension over the width of the liner to the extent possible), pressure can be equally distributed throughout the liner to reduce liner wearing or tearing.

Still further, in such modified designs, the vertical span of the label can be minimized, which decreases the likelihood of "stubbing" occurring after the label has been removed from the liner and is to be attached to an object. This vertical span is based upon the angles of the peel plate, which can be altered to reduce the likelihood of stubbing. It will, of course, be understood that the term "vertical" is used as a relative direction based on the example illustrated, and this is really being used to describe a height difference in the direction generally perpendicular to the liner over its liner path in the region of the peel plate of the label-dispensing apparatus if the liner was unfolded.

According to one aspect, an asymmetric peel plate is disclosed for a label-dispensing apparatus for separating labels from a liner as the liner travels along a liner path extending in a longitudinal direction through the label-dispensing apparatus. The asymmetric peel plate includes one or more liner support surfaces defining a portion of the liner path and further includes a peel edge disposed at a longitudinally forward end of the liner support surface(s) in which the peel edge extends forwardly along the longitudinal direction to a peel edge apex. No plane exists perpendicular to the liner path if the liner was unbent that is collinear with a bending line in which the peel edge is reflectionally symmetrical about the plane.

In some forms, the liner support surface(s) may have a datum edge on a lateral side thereof. The peel edge apex may be closer to the datum edge than to an opposing lateral side of the asymmetric peel plate.

In some forms, a shape profile of the peel edge and of the liner support surface(s) may be selected to equalize a liner path length over a width of the liner as the liner travels along the liner path from a supply roll prior to the asymmetric peel plate, over the liner support surface(s), over the peel edge to separate labels from the liner, and to a take-up mechanism after the peel edge.

In some forms, the peel edge may be rounded. In some forms, the peel edge apex and/or the peel edge may be rounded in both the longitudinal direction of travel over the peel edge as well as in a lateral direction.

According to another aspect, a label-dispensing apparatus is provided in which the label-dispensing apparatus includes the asymmetric peel plate as described above and herein with any of the various combinable permutations and variations of features.

According to yet another and more specific aspect, an asymmetric peel plate is provided for a label-dispensing apparatus for separating labels from a liner as the liner travels along a liner path extending in a longitudinal direction through the label-dispensing apparatus. The asymmetric peel plate includes a set of liner support surfaces that define a portion of the liner path. The set of liner support surfaces are angled with respect to one another and converge at a bending line that runs parallel with the longitudinal direction. A peel edge is disposed at a longitudinally forward end of the set of liner support surfaces along the liner path. The peel edge has a set of peel edge linear portions that are angled with respect to one another. These peel edge linear portions converge at a peel edge apex that is positioned at a forward end of the bending line. In this asymmetric peel plate, no plane exists perpendicular to the liner path if the liner was unbent that is collinear with a bending line about which the peel edge and the set of liner support surfaces are both reflectionally symmetrical about the plane. This effectively means that the liner support surfaces and/or linear peel edges are differently angled with respect to one another relative to the bending line or a plane extending through the bending line.

In some forms of the asymmetric peel plate, one of the set of liner support surfaces may have a datum edge on a lateral side thereof. In such case, the bending line and peel edge apex may be closer to the datum edge than to an opposing lateral side of the asymmetric peel plate on the other one of the set of liner support surfaces. The angle between the bending line and the peel edge linear portion on a side of the peel plate having the datum edge may be less than the angle between the bending line and the peel edge linear portion on an opposing side of the peel plate. The asymmetric peel plate may have a plane perpendicular to the liner path if the liner was unbent that is collinear with the bending line. An angle measured along a plane perpendicular to the bending line between each of the set of liner support surfaces and the plane perpendicular to the liner path that is collinear with the bending line may be different, with an angle between that plane and the liner support surface on the side of the peel plate having the datum edge being less than the an angle between the plane and the liner support surface on the opposing side of the peel plate not having the datum edge. The angles of the set of liner support surfaces and the set of peel edge linear portions may be selected to equalize a liner path length over a width of the liner as it travels along a liner path from a supply roll prior to the asymmetric peel plate, over the set of liner support surfaces, over the peel edge to separate labels from the liner, and to a take-up mechanism after the peel edge.

In some forms, regardless of the presence of a datum edge, the angles as measured between each of the set of peel edge linear portions and/or the bending line may be generally different from one another. Again, in some forms, the asymmetric peel plate may have a plane perpendicular to the liner path if the liner was unbent that is collinear with the bending line. An angle measured between each of the set of liner support surfaces and the plane perpendicular to the liner path if the liner was unbent that is collinear with the bending line when taken through a plane perpendicular to the bending line may be different from one another. There may also be different angles between the bending line and the linear portions of the peel edge.

In some forms, an angle between the bending line and each of the respective ones of the set of peel plate linear edges may be less than 90 degrees. Likewise, an angle between the plane perpendicular to the liner path if the liner was unbent and that is collinear with the bending line and each of the respective ones of the set of liner support surfaces in a plane perpendicular to the bending line if the liner was unbent that is collinear with the bending line may be less than 90 degrees.

In some forms, the peel edge may be rounded or have a radius. At the peel edge apex, the peel edge apex may be rounded in both the longitudinal direction of travel over the peel edge as well as in a lateral direction between the peel edge linear portions.

According to another aspect, a label-dispensing apparatus is provided in which the label-dispensing apparatus includes the asymmetric peel plate as described above and herein with any of the various combinable permutations and variations of features.

According to still another aspect, a peel assist plate is disclosed for coupling to a peel plate (whether symmetrical or asymmetrical) in order to form a label-dispensing apparatus for separating labels from a liner as the liner travels along a liner path extending in a longitudinal direction through the label-dispensing apparatus. The peel assist plate includes a set of peel assist surfaces which is comprised of a plurality of linear ribs in which the linear ribs extend in the longitudinal direction and are laterally spaced from one another.

In some forms, the peel assist plate may further include one or more support surfaces and the plurality of linear ribs may protrude from the support surface(s).

In some forms, the peel assist plate may be configured to conform to the peel plate so as to provide lines of contact for the liner in the space between the peel assist plate and the peel plate. For example, the various peel assist surfaces provided by the linear ribs can closely match the profile of the paired peel plate at locations over the peel plate where both would support the liner. In this way, the peel assist plate helps to ensure the liner conforms to take on the desired bend in a label dispensing apparatus.

In some forms, the linear ribs may be arranged in a V-shaped arrangement with one of the ribs providing a linear peak. This may help to ensure that a bend of the liner and label that is more pointed than if there was no rib in this location at the peak.

In some forms, the linear ribs may not be reflectionally symmetrical about the one of the ribs providing the linear peak (e.g., in a plane through the rib providing the linear peak if that plane was drawn perpendicular to the liner if the liner was unbent).

According to still another aspect, a label-dispensing apparatus is provided including a peel assist plate as described above and herein with any of the various combinable permutations and variations of features including those of the asymmetric peel plates described.

These and still other advantages of the invention will be apparent from the detailed description and drawings. What follows is merely a description of a preferred embodiment of the present invention. To assess the full scope of the invention, the claims should be looked to as the preferred embodiment is not intended to be the only embodiment within the scope of the claims.

DETAILED DESCRIPTION OF THE PREFERRED EMBODIMENT

Figure 1:
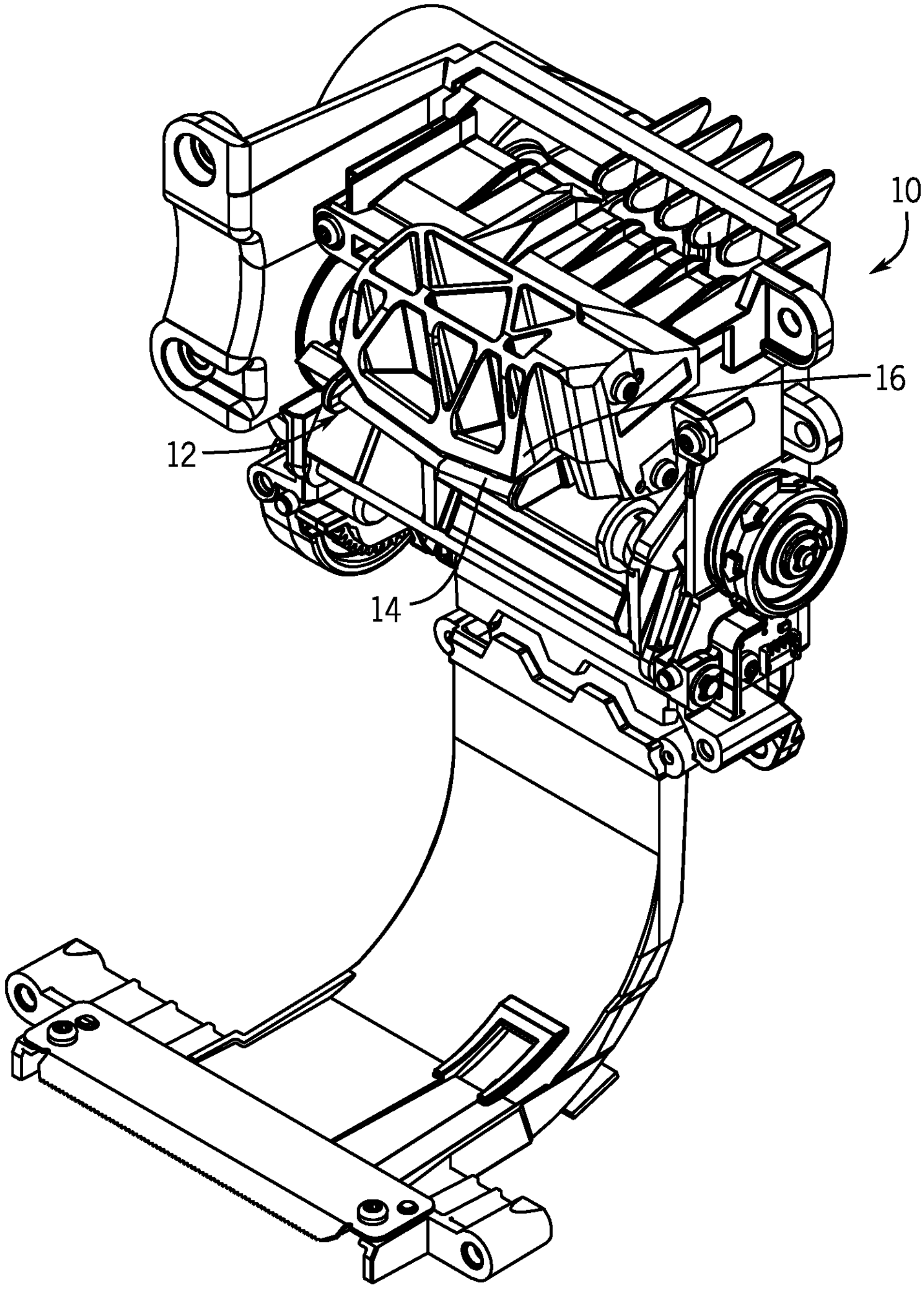
FIG. 1 is a top, front, side perspective view of an exemplary label-dispensing apparatus that is part of a printer (not shown in full).
Figure 9:
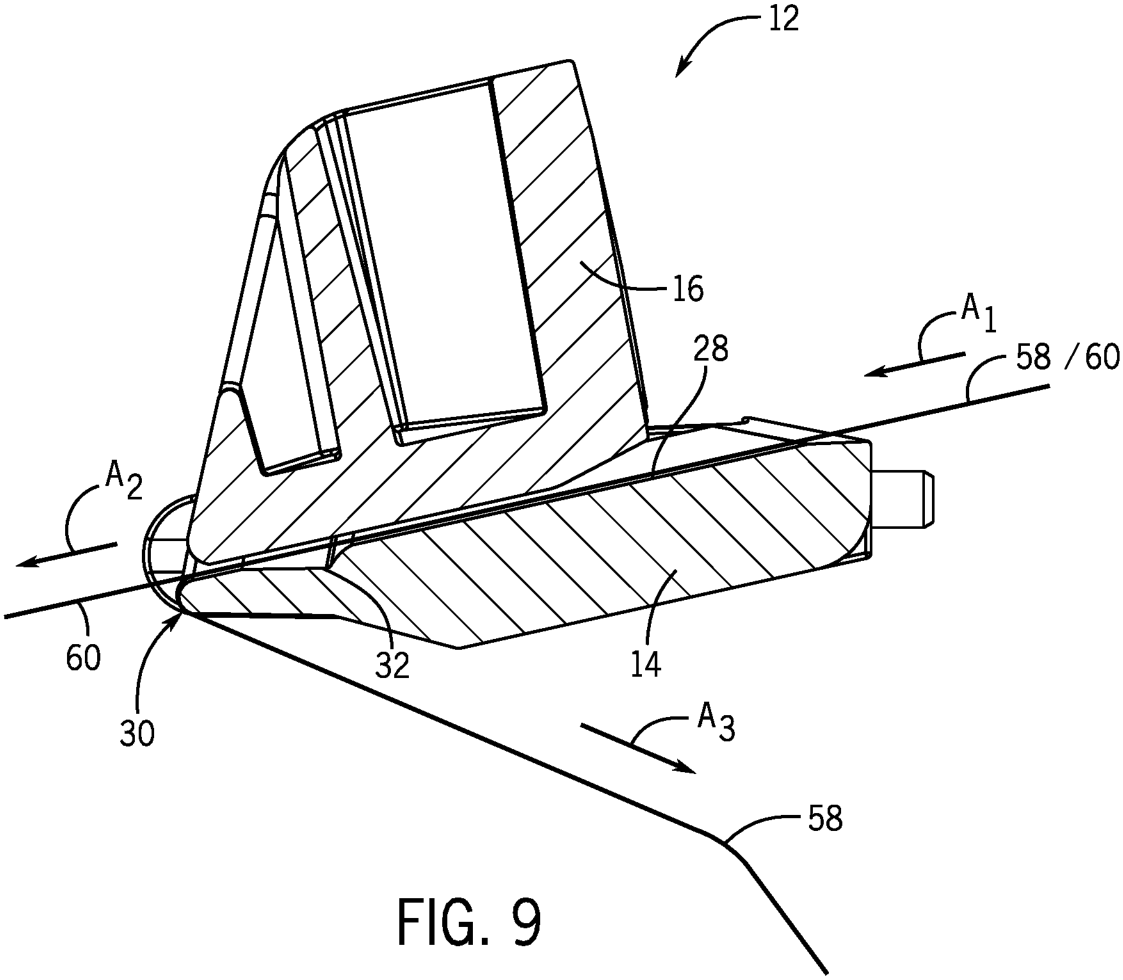
FIG. 9 is a side cross-section view illustrating a liner path through the aforementioned label-dispensing apparatus and, in particular, between the peel plate and the peel assist plate.

Referring first to FIG. 1, a portion 10 of a printer for printing of labels provided on a continuous liner and separating the printed labels from the liner is illustrated. Specifically, in FIG. 1, a label-dispensing apparatus 12 is shown (along with some surrounding driving and mounting elements for the printer) in which the label-dispensing apparatus 12 is configured to separate printed labels from a liner. Although their descriptions are not necessary for an understanding of the disclosed label-dispensing apparatus 12, it is to be appreciated that, prior to the label-dispensing apparatus 12, there may be typically a printing mechanism that will print on the labels on the liner and, after the label-dispensing apparatus 12, there may be a mechanical device for attachment of the separated labels to objects as well as a take-up mechanism (for example, a return roll or nip point that tensions and pulls the liner) for collecting the now label-less liner. In the label-dispensing apparatus 12 itself, the labels are separated from the liner by bending the liner in a direction transverse to the direction of travel of the liner path and then, while still bent, turning the liner over a peel edge (as illustrated, at approximately 145 degrees from the original liner path as best shown in FIG. 9) such that the label, which is more rigid than the liner when bent in the transverse direction, continues forward and separates from the liner while the liner is turned back over the peel edge.

It will be appreciated that the label-dispensing apparatus and surrounding mechanical components are typically received in a larger housing or a case that includes not only the illustrated components, but also other components such as, for example, components that support a supply of the liner and labels (for example, a roll or a folded stack), components that feed the liner and labels through the printer, and components that are used to take up the liner after the labels have been separated from the liner and/or tension/pull the liner. Again, label-dispensing apparatuses and their use is generally known from U.S. patent application publication no. 2012/0312458 published on Dec. 13, 2012 which is incorporated by reference for all purposes as it set forth in its entirety herein for at least the purpose of explaining the general operation and use of such label-dispensing apparatuses.

Figure 2:
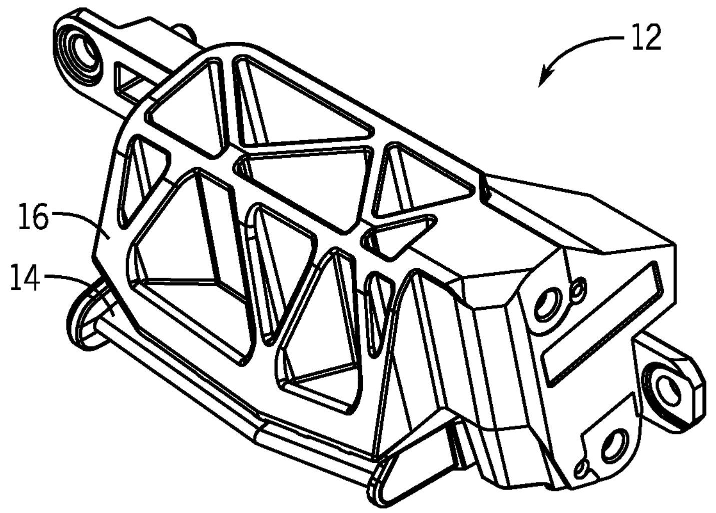
FIG. 2 is a top front side perspective view of the peel plate and peel assist plate apart from the rest of the label-dispensing apparatus shown in FIG. 1.
Figure 3:
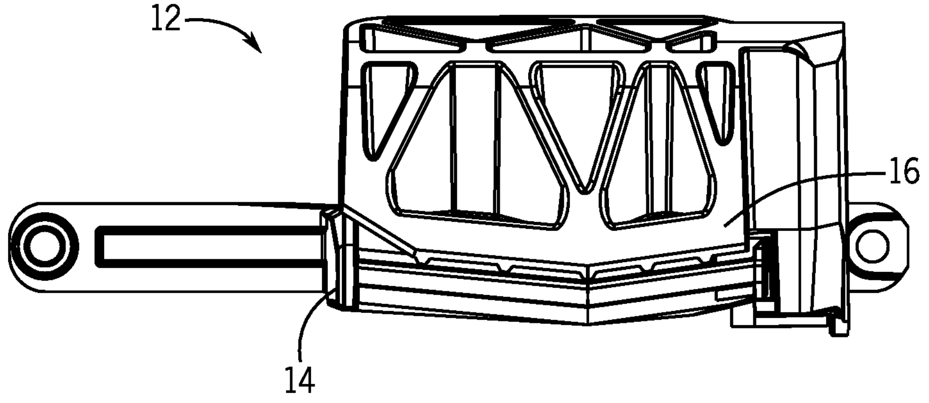
FIG. 3 is a front elevation view of the peel plate and peel assist plate of FIG. 2.
Figure 4:
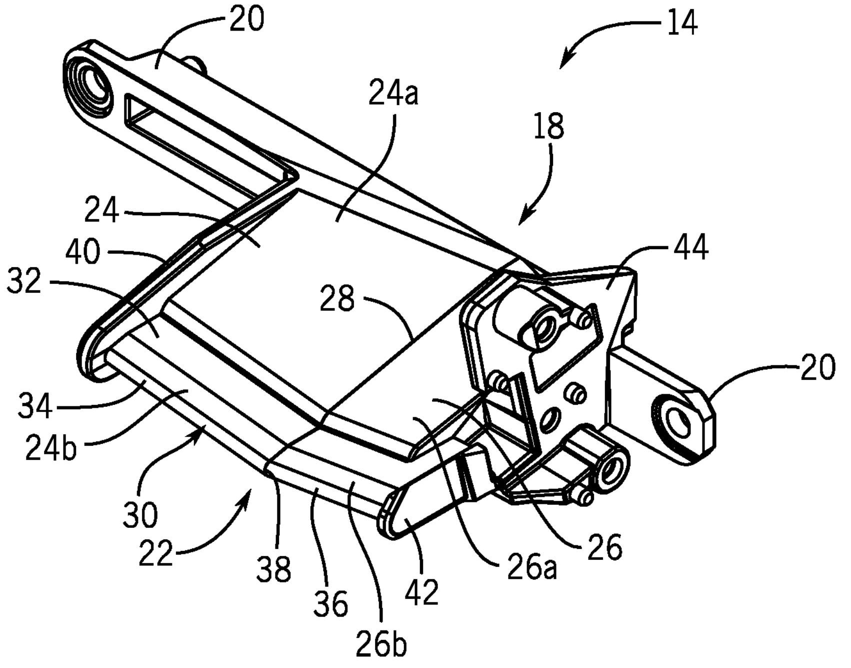
FIG. 4 is a top, front, side perspective view of a peel plate of the label-dispensing apparatus with the peel assist plate removed to better show the liner support surfaces and the peel edge.

Now with additional reference being made to FIGS. 2 and 3, a portion of the label-dispensing apparatus 12 is shown separate from the rest of portion 10 of the printer including an asymmetric peel plate 14 and a peel assist plate 16 which are coupled to one another. They are shown in FIGS. 2 and 3 in their relative positions with respect to one another during use and are now described separately.

Turning now to FIGS. 4 through 7, the asymmetric peel plate 14 is shown apart from the peel assist plate 16. The peel plate 14 extends longitudinally from a generally rearward end 18—which includes a pair of lateral mounting flanges 20 for mounting within the greater device—to a generally forward end 22.

The peel plate 14 includes a set of liner support surfaces 24 and 26. These liner support surfaces 24 and 26 define a portion of the liner path and are angled with respect to one another to converge at a bending line 28 to form a V-shaped concave channel when viewed down the longitudinal direction. The bending line 28 runs generally parallel with the liner path over these liner support surfaces 24 and 26 and, similarly, runs generally parallel with the longitudinal direction of the peel plate 14. As illustrated, the set of liner support surfaces 24 and 26 are each generally planar in nature and extend forwardly to a peel edge 30. It is observed that, as illustrated, there is a small step 32 at the forward end 22 between first planar portions 24*a* and 26*a* of the set of liner support surfaces 24 and 26 and second planar portions 24*b* and 26*b* which at their forward-most end have the peel edge 30. This step 32 is also evident in FIG. 9 in side view. It will be appreciated that while such step 32 is illustrated in the exemplary embodiment, that such a step may well be omitted and that the liner support surfaces may be planar right up to peel edge 30.

Here it is briefly noted that while a set of generally planar support surfaces have been illustrated (albeit with a step in the middle) on a peel plate, that it is contemplated that in some forms, the surfaces do not need to have planar surfaces and some or all of the liner support surfaces may be curved in full or in part. Similarly, while a bending line 28 is illustrated that is generally linear, it is noted that, even as illustrated, the bending line 28 has a slight radius in the lateral direction and does not need to truly be an edge or hard line. Rather the bending line can be conceived as a localized minimum in the lateral direction or a rough point of convergence of the two sides of the peel plate. In the case where the liner support surfaces are curved, the so-called bending "line" may be even more gradual in form or geometry and could be, for example a fairly gentle curve from lateral side-to-side.

Figure 7:
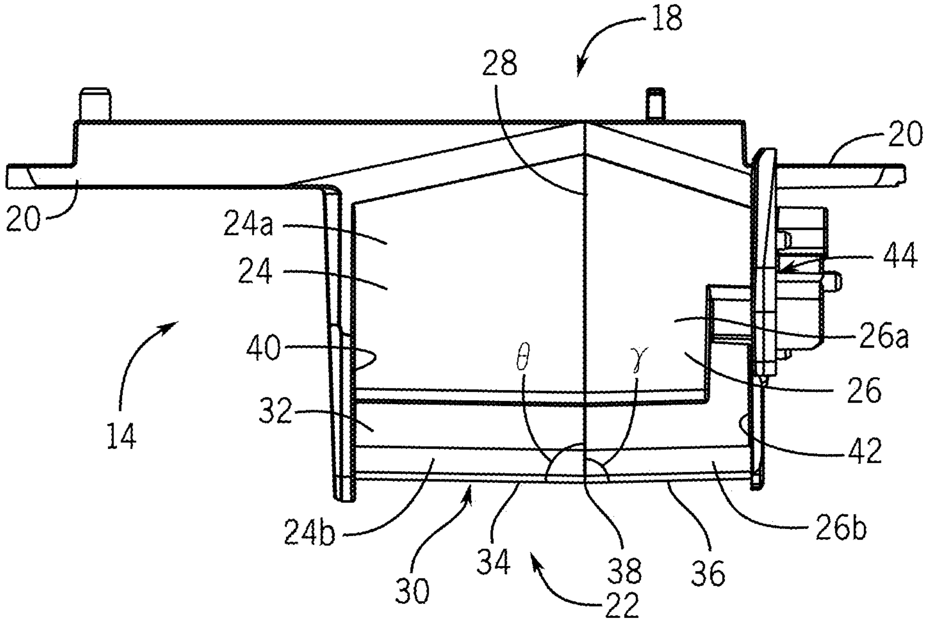
FIG. 7 is a top view of a peel plate shown in FIG. 4.

Returning now to the specifically illustrated embodiment, with respect to the peel edge 30, the peel edge 30 is at the longitudinally forward end 22 of the peel plate 14 and includes a pair of peel edge linear portions 34 and 36 that are associated with the liner support surfaces 24 and 26, respectively. These peel edge linear portions 34 and 36 are angled with respect to one another and converge at a peel edge apex 38 that is positioned at a forward end of the bending line 28. Given this geometry, the angle between the bending line 28 and each of the respective peel edge linear portions 34 and 36 are less than 90 degrees each, so that the peel edge apex 38 extends slightly forward to a tip. With particular reference to FIG. 7, it will be seen that this peel edge apex 38 in the illustrated embodiment is only very slightly forward of the lateral sides of the pair of peel edge linear portions 34 and 36 with an angle of a few degrees; however, this tip could be more prominent in other forms of the label-dispensing apparatus. Nonetheless, the forward positioning of the peak edge apex 38 or tip helps to make sure that the lateral sides or corners of the label are first separated from the liner, as those lateral edges will straddle the bending line 28 and the peak edge apex 38. The odds of a consistently successful "peel" or separation is increased when these laterally-positioned corners of the label are made to separate first.

It is to be appreciated that both the peel edge 30, including both the peel edge linear portions 34 and 36 and the peel edge apex 38 can be rounded or curved with radii and do not need to be sharp, straight edges (and, in fact, preferably are not). For example, because the liner travels or is bent over the peel edge 30, the peel edge linear portions 34 and 36 are curved in the longitudinal direction and along the path of travel of the liner. Still further, the peel edge apex 38 may be curved both in the longitudinal direction along the path of travel for the liner as well as in the side-to-side lateral direction connecting the two peel edge linear portions 34 and 36. Among other things, the presence of these radii or curves can help to minimize tension on the liner and can help to equalize tension over the width of the liner. In some forms, the degree or curved surface may be varied side-to-side to help achieve the desired tension profile.

With reference to the earlier discussion that the liner support surfaces do not necessarily need to be planar, it is likewise the case that although a peel edge with linear portions has been illustrated in the exemplary embodiment, the peel edge could be made of one long continuous curve in the lateral side-to-side direction and does not need to have linear portions. As noted above, the overall geometry of the liner support surfaces and the peel edge (along with upstream and downstream features that interact with the liner) will affect the tension of the liner at any particular position over its width. Accordingly, whichever profiles utilized, whether planar, linear, or curved, ideally should be shaped to equalize tension.

On the lateral sides of the peel plate 14, there are a guides 40 and 42 and one of these guides 42—which is also closer to the bending line 28, which itself is off-center-define a datum edge or surface against which the lateral edge of liner may run during operation as will be discussed in greater detail below. These guides 40 and 42 can also help keep the liner on the liner path, especially in back-feeding situations in which the tension on the liner is reduced and the liner is fed backwards. There is also an upwardly-extending connection structure 44 on one of the lateral sides which can be used for mechanical connection to the peel assist plate 16 and/or the rest of the structure of the printer.

With the general structure of the peel plate 14 having been described, what is notable about the disclosed peel plate is that it is asymmetrical. Specifically, the liner support surfaces 24 and 26 and the set of peel edge linear portions 34 and 36 are not reflectionally symmetrical about the bending line 28. Rather, at least one of the set of liner support surfaces 24 and 26 and the set of peel edge linear portions 34 and 36 are angled differently with respect to the bending line 28 and a dividing plane running vertically therethrough. It will be appreciated that while the lack of symmetry above is made with reference to a set of planar liner support surfaces and a peel edge with linear portions, that this asymmetry would be possible to obtain with curved support surfaces and/or peel edges.

Some specific exemplary geometries will be further detailed below, but it is important to understand that this asymmetric geometry is employed in order to facilitate the locating of the bending line 28 and/or peel edge apex 38 off center and closer to the datum edge or guide 42. By offsetting the bending line 28 and/or peel edge apex 38, there can be a wider range of widths of labels potentially used in a single label-dispensing apparatus while maintaining the datum edge in contrast to symmetrical designs for label dispensers in which the bending line and/or peel edge apex 38 would need to be in the center of the peel plate. One way to understand this is that, especially when the edge of the label to be applied is designed to be aligned on a lateral side with an target location of application on the item being labelled, offsetting the bending line 28 and/or peel edge apex 38 towards the datum edge or guide 42 provides that smaller labels can be carried on the liner and still be within the target region of the bending line 28 and/or peel edge apex 38, even if they are slightly off center alignment with the bend line 28 and/or peel edge apex 38 but within a range in which they could still be reliably dispensed. These conditions can then be more easily met with labels of shorter width while still maintaining a target distance between the lateral edge of the label and the datum edge The asymmetric geometry of the peel plate 14 can also be shaped so as to equalize as much as reasonably possible the tension over the width of the liner as well as to permit operation at minimal tensions. By carefully modifying the angles of both the liner support surfaces and the peel edge linear surfaces so they are different from their companions (or otherwise shaping the geometries if these features are curved), it is possible to create an approximately equal path length for the liner (and therefore, even tensions) over the width of the liner. While such shaping can be done independently of any change of the bending line or peel edge apex (i.e., this adjustment could be made even without moving the bending line and/or peel edge apex off center), such adjustments can be useful in accommodating a shifting of the bending line 28 and/or peak edge apex 38 towards the datum edge 42 towards a non-centered position.

Figure 5:
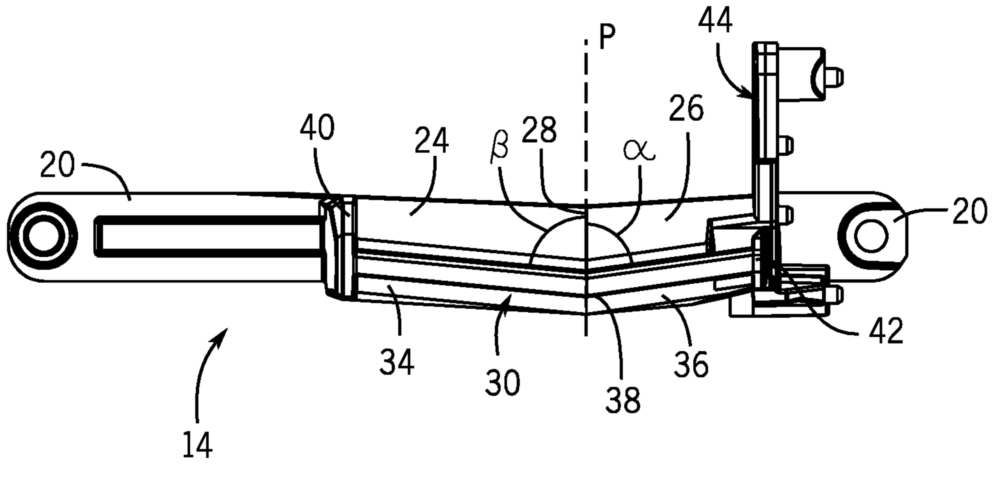
FIG. 5 is a front elevation view of the peel plate of FIG. 4.
Figure 6:
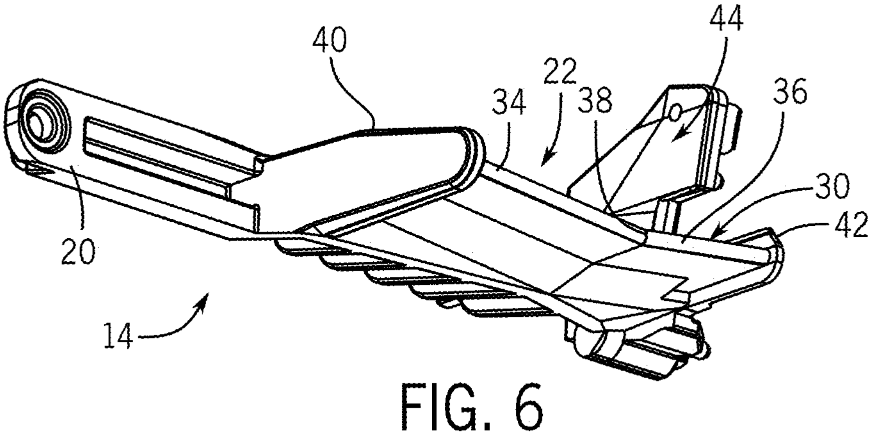
FIG. 6 is a bottom, front, side perspective view of the peel plate of FIG. 4.

In the particular form illustrated and as best illustrated in the front view of FIG. 5, the angle $\alpha$ between the liner support surface 26 and a plane "P" perpendicular to the liner path if the liner was not bent or folded and that is collinear with the bending line 28 is less than the angle $\beta$ between the liner support surface 24 and this plane "P." As best seen in FIG. 7, to help then equalize path lengths across the width, the angle $\gamma$ between the peel edge linear portion 36 and the bending line 28 can be made less than the angle $\theta$ between the peel edge linear portion 34 and the bending line 28. Again, it will be generally appreciated equalization of liner path length may be altered by adjusting these four angular parameters and, still further, that such path lengths can be equalized by variable shaping of the radius of the peel edge 30 and/or by further adjusting the liner path beyond the peel edge 30 using a specially-shaped transition member, for example, such as is described in U.S. Pat. No. 8,524,027 issued on Sep. 3, 2013, which is incorporated herein by reference for all purposes. Likewise, this geometric adjustment can be conceptually expanded to more complicated shaping beyond just "angular" adjustments if the peel plate geometry is curved in one or more aspects as discussed above. The distance of interest to be equalized will be from, for example, the supply roll to the take up mechanism which should ideally be equal at both lateral sides of the liner and the various positions over the width therebetween.

Still further and as illustrated, the angles $\alpha$ and $\beta$ of the liner support surfaces 24 and 26 can be adjusted so as to reduce a vertical span or height of the label as it is dispensed and projects away from the liner during application. Again, a similar control of profile may be obtained in the case where the surfaces and/or peel edges are curved to also obtain this reduced difference in vertical span or height when the label is bent. While on one hand, there must be some bend so as to effectuate an increased stiffness of the label relative to the liner, if the bend is too great in the dispensed label, then that bend may persist in too great an extent in the tip of the separated label and create an increased likelihood of the label "stubbing" into the object to which the label is to be attached.

The angles of the liner support surfaces 24 and 26 and the peel edge linear portions 34 and 36 also can be altered to reduce the likelihood of skewing of the label as it attaches to the object or as a result of the aforementioned stubbing.

It should be appreciated that, while a specific peel plate with particular geometric conditions has been described above and shown in the attached figures, that peel plate could be altered dimensionally to accommodate differed widths and thicknesses of liner. For example, the point at which the two liner support surfaces come together could be shifted to peel labels at alternative locations or a range of locations on the liner without sacrificing the ability to curve the label to provide stability when the label is projected outward. The particular illustrated exemplary embodiment is designed to work with two label widths of varying lengths on one width of liner. However, further dimensional changes may be merited to peel a greater variety of labels or liners.

Figure 8:
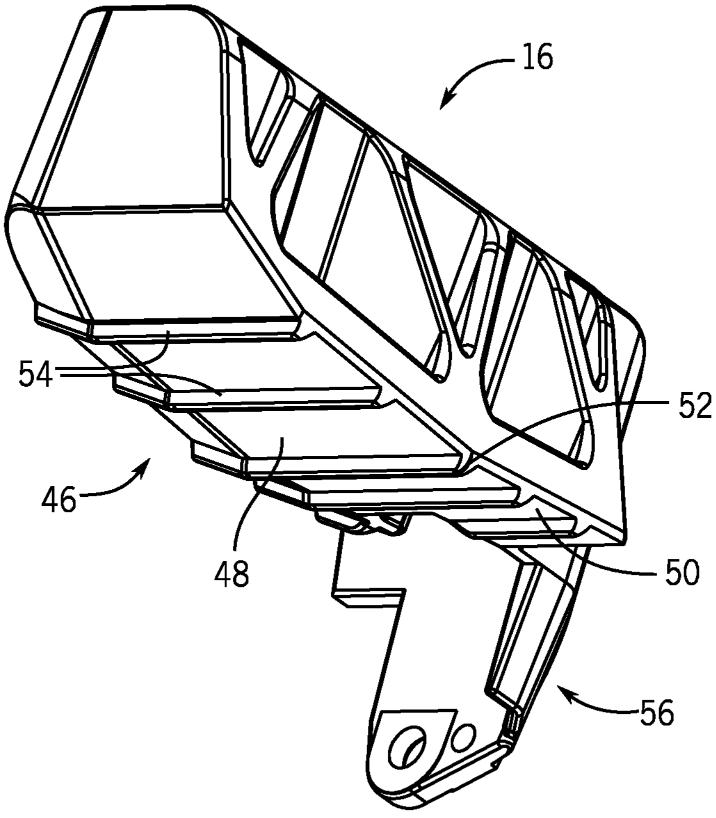
FIG. 8 is a bottom, front, side perspective view of a peel assist plate of the label-dispensing apparatus shown in FIG. 1 which best shows the linear ribs.

Turning now to FIG. 8, the peel assist plate 16 is illustrated which, along with the peel plate 14, helps in ensuring that the label and liner are temporarily bent in the label-dispensing apparatus by contacting the upper surface of the label and liner to force it to comply with the concave upper surface of the peel plate 14. Most notably and as can be seen from the angle of the view taken in FIG. 8, the peel assist plate 16 has a lower side 46 including a set of support surfaces 48 and 50 which are generally planar in nature. The support surfaces 48 and 50 are angled with respect to one another to converge at a central ridge 52 to provide a convex V-shaped profile running along the longitudinal direction. This profile, and in particular, the outmost surface of the ribs 54 that provide peel assist surfaces for contacting the liner as will be described in greater detail below, generally corresponds to the profile of the liner support surfaces 24 and 26 of the peel plate 14 with the central ridge 52 generally aligning with the bending line 28.

Notably, the set of support surfaces 48 and 50 have a plurality of linear ribs 54 protruding from set of support surfaces 48 and 50. The plurality of linear ribs 54 extend in the longitudinal direction and are laterally spaced from one another. As illustrated, one of the ribs 54 is also coincident with the central ridge 52. When the peel assist plate 16 is assembled to the peel plate 14 (for example, by attaching/affixing a downwardly-extending connecting structure 56 of the peel assist plate 16 to the upwardly-extending connecting structure 44 of the peel plate 14), the ribs 54 are positioned to provide peel assist surfaces that come into contact with the upper surface of the liner and labels supported thereon. These ribs 54 provide a benefit over a purely planar surface—as is conventional in such peel assist plates—in that they are less subject to the building up of adhesive or other debris on the surfaces that may come from the edges of the label on the liner. Such adhesive may slowly accrete until such buildup causes issues with running the liner through the space between the peel plate 14 and the peel assist plate 16 (for example, sticking or gumming up the liner and its ability to be fed). Instead, with the rib structure, any excess adhesive flows or travels through the space between the ribs 54 and can be evacuated from the volume between the peel plate 14 and the peel assist plate 16 with the travel of the liner.

It will be appreciated that while the ribs are shown as projecting from so-called support surfaces in close proximity to, but slightly spaced from, the peel plate there do not need to be one or more support surfaces as part of the peel assist plate. Rather, the ribs and their provided peel assist surfaces could be supported in some other manner. For example, the ribs could be connected to part of a frame well-spaced from the liner support surface(s) or be supported by a porous network or other structures.

The meaningful part of this new peel assist plate is generation of the lines of contact by the ribs and, since the other structure of the peel assist plate primarily exists to support those ribs and to provide some amount of positioning or mounting of the ribs relative to the peel plate, the particular surrounding structure (e.g., the support surfaces) is contemplated as taking various other forms without departing from the spirit of the concept.

Finally and referring to FIG. 9, the general operation of the label-dispensing apparatus 12 is illustrated in side view. As illustrated in FIG. 1, a liner 58 carrying labels 60 is initially fed in to the label-dispensing apparatus 12 from the upper right side of the figure as illustrated by the arrow $A_1$. Note that the liner with labels on it is identified by the reference numeral "58/60" as the labels 60 are so thin as to not be visually identified on the liner 58 in the black and white line drawing. The liner 58 with labels 60 is fed into the space between the asymmetric peel plate 14 and the peel assist plate 16. In the space between the asymmetric peel plate 14 and the peel assist plate 16, the liner support surfaces 24 and 26 of the asymmetric peel plate 14 and the ribs 54 on the peel assist plate 16 cause the liner 58 and labels 60 to bend at the bending line 28. Although not illustrated in FIG. 9, the lateral side of the liner 58 abuts the datum edge provided by guide 42 to ensure proper positioning of the liner 58 and the labels 60 provided on it. Then, at the peel edge 30, the label 60 is separated from the liner 58 and continues forward according to arrow $A_2$ based on the comparatively greater stiffness of the label 60 when bent, while the liner 58 wraps around the peel edge 30 with the liner 58 then proceeding back over the peel edge 30 to a take-up mechanism following arrow $A_3$. Thus, collectively, the segment of the liner illustrated path is defined by the arrows $A_1$ and $A_3$, with the arrow $A_2$ reflecting the direction of label dispensing in the apparatus. It will be understood that, in some forms, there may be a printer just prior the label-dispensing member 12 and that after the label is dispensed there may be a label-affixing mechanism to ensure the label is attached to the target object robustly.

It is contemplated that both the asymmetric peel plate 14 and the peel assist plate 16 may be made of various materials; however, certain types of polymers may be particularly preferred because of their frictional qualities (that is, having a low coefficient of friction such that the liner is less prone to resistance and the tension on the liner may be reduced overall. In one form, both the asymmetric peel plate 14 and the peel assist plate 16 may be made of a custom polymer selected for its dimensional stability when injected molded to hold the tolerances for the peel edge geometry, lubricity to allow the liner to be pulled across it with minimal drag and prevent adhesive buildup, stiffness, and conductivity to dissipate static. However, this is but one example material and it is likely that alternative materials would perform as well in these different areas.

While an improved label-dispensing apparatus is shown with an asymmetric peel plate and a peel assist plate with ribs, it is contemplated that these items could be used in combination with one another or independently of one another. For example, an asymmetric peel plate could be potentially used without a peel assist plate or potentially used with a conventional peel assist plate that has flat surfaces rather than ribs (although the benefits of using peel assist plate or the peel assist plate with the ribs, specifically, would then be lost if that plate was omitted). Still further, it is contemplated that while the peel plate and peel assist plate are illustrated as separate objects that are joined, 3D printing or other additive manufacturing methods could potentially be used to make the label-dispensing apparatus one unitary component with a continuous and uninterrupted body rather than assembled separately from a peel plate and peel assist plate.

Additionally, it is contemplated that the peel assist plate with ribs could be used with peel plates other than of the kind discussed herein. For example, the peel assist plate with ribs might be shaped to correspond to a symmetric peel plate or a peel plate that is asymmetrical, but in a way other than that described specifically herein.

Many modifications and variations to this preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. An asymmetric peel plate for a label-dispensing apparatus for separating labels from a liner as the liner travels along a liner path extending in a longitudinal direction through the label-dispensing apparatus, the asymmetric peel plate comprising:

a set of liner support surfaces defining a portion of the liner path, the set of liner support surfaces being angled with respect to one another and converging at a bending line running parallel with the longitudinal direction; and a peel edge disposed at a longitudinally forward end of the set of liner support surfaces, the peel edge having a set of peel edge linear portions being angled with respect to one another and converging at a peel edge apex that is positioned at a forward end of the bending line;

wherein no plane exists perpendicular to the liner path if the liner was unbent that is collinear with the bending line in which the peel edge and the set of liner support surfaces are both reflectionally symmetrical about the plane;

wherein angles as measured between each of the set of peel edge linear portions and the bending line are different from one another; and wherein the asymmetric peel plate has a plane perpendicular to the liner path if the liner was unbent that is collinear with the bending line and wherein an angle measured between each of the set of liner support surfaces and the plane perpendicular to the liner path if the liner was unbent that is collinear with the bending line are different from one another.

2. The asymmetric peel plate of claim 1, wherein one of the set of liner support surfaces has a datum edge on a lateral side thereof.

3. The asymmetric peel plate of claim 2, wherein the bending line and the peel edge apex are closer to the datum edge than to an opposing lateral side of the asymmetric peel plate on the other one of the set of liner support surfaces.

4. The asymmetric peel plate of claim 3, wherein the angle between the bending line and the peel edge linear portion on a side of the peel plate having the datum edge is less than the angle between the bending line and the peel edge linear portion on an opposing side of the peel plate.

5. The asymmetric peel plate of claim 4, wherein the angle between (i) the plane perpendicular to the liner path if the liner was unbent that is collinear with the bending line and (ii) the liner support surface on the side of the peel plate having the datum edge being less than the angle between (iii) the plane perpendicular to the liner path if the liner was unbent that is collinear with the bending line and (iv) the liner support surface on the opposing side of the peel plate not having the datum edge.

6. The asymmetric peel plate of claim 5, wherein the angles of the set of liner support surfaces and the set of peel edge linear portions are selected to equalize a liner path length over a width of the liner as it travels along a liner path from a supply roll prior to the asymmetric peel plate, over the set of liner support surfaces, over the peel edge to separate labels from the liner, and to a take-up mechanism after the peel edge.

7. The asymmetric peel plate of claim 1, wherein an angle between the bending line and each of the respective one of the set of peel plate linear edges is less than 90 degrees.

8. The asymmetric peel plate of claim 1, wherein the peel edge is rounded.

9. The asymmetric peel plate of claim 8, wherein the peel edge apex is rounded in both the longitudinal direction of travel over the peel edge as well as in a lateral direction between the peel edge linear portions.

10. A label-dispensing apparatus comprising the asymmetric peel plate of claim 1.

* * * * *